United States Patent [19]

Kiriyama et al.

[11] Patent Number: 5,757,570
[45] Date of Patent: May 26, 1998

[54] REEL SERVO DEVICE FOR RECORDING/REPRODUCING APPARATUS EMPLOYING A TAPE AS RECORDING MEDIUM

[75] Inventors: Hiroshi Kiriyama; Haruyuki Kouno; Kunika Hashimoto, all of Kanagawa, Japan

[73] Assignee: Sony Corporation, Tokyo, Japan

[21] Appl. No.: 761,715

[22] Filed: Dec. 6, 1996

Related U.S. Application Data

[63] Continuation of Ser. No. 447,640, May 23, 1995, abandoned, which is a continuation of Ser. No. 59,680, May 12, 1993, abandoned.

[30] Foreign Application Priority Data

May 13, 1992 [JP] Japan ................. 4-146917

[51] Int. Cl.$^6$ ..................................... G11B 15/43
[52] U.S. Cl. ..................................... 360/71; 242/334
[58] Field of Search ................. 318/7; 242/75.51, 242/186, 190, 191, 334.1, 334.3, 334.6, 334; 360/74.3, 69, 71, 73.09, 73.14

[56] References Cited

U.S. PATENT DOCUMENTS

| | | | |
|---|---|---|---|
| 4,461,433 | 7/1984 | Kani | 242/75.51 |
| 4,553,182 | 11/1985 | Narita | 360/69 X |
| 5,039,027 | 8/1991 | Yanagihara et al. | 242/190 |
| 5,165,622 | 11/1992 | Arai | 242/191 |
| 5,259,563 | 11/1993 | Kakiwaki et al. | 242/191 |
| 5,282,586 | 2/1994 | Suzuki et al. | 242/190 |

*Primary Examiner*—Aristotelis M. Psitos
*Assistant Examiner*—James L. Habermehl
*Attorney, Agent, or Firm*—Jay H. Maioli

[57] ABSTRACT

A reel servo device employed in a recording and/or reproducing apparatus employing a tape cassette housing a tape as a recording medium includes an unusual running detection circuit for deciding if the tape housed within the tape cassette loaded on the tape recording and/or reproducing apparatus is wound in a slack winding state on a tape reel. If the tape running state is decided to be an unusual tape running state, tape tension data from the supply side tension arm is differentiated. If the differentiation data is positive indicating an increasing tape tension, the rewind side reel motor is controlled in a direction of slackening tape tension at the rewind tape reel side. Conversely, if the differentiation data is negative indicating an decreasing tape tension, the rewind side reel motor is torqued in a direction of tensioning the tape at the rewind tape reel side.

6 Claims, 4 Drawing Sheets

REEL SERVO DEVICE FOR RECORDING/ REPRODUCING APPARATUS EMPLOYING A TAPE AS RECORDING MEDIUM

This is a continuation of application Ser. No. 08/447,640 filed May 23, 1995, now abandoned, which is a continuation of application Ser. No. 08/059,680, filed May 12, 1993, now abandoned.

BACKGROUND OF THE INVENTION

1. Field of the Invention

This invention relates to a reel servo device employed in a recording and/or reproducing apparatus employing a tape as a recording medium. More particularly, it relates to a reel servo device for controlling rotation of reel motors rotationally driving tape reels adapted for tape rewinding and reeling.

2. Description of the Related Art

In a recording and/or reproducing apparatus employing a tape, such as a magnetic tape, as a recording medium, a tape reel for rewinding or reeling the tape is usually driven by a reel motor. For a fast feed mode or a rewind mode for running the tape at an elevated velocity, a reel servo is employed for stabilizing the rotational torque and the number of revolutions of the reel motor adapted for rotationally driving the tape reel that is responsible for tape rewinding or reeling.

Meanwhile, in a tape cassette in which a supply side tape reel and a rewind side tape reel are rotatably supported within a main cassette body and a tape is wrapped around these tape reels, there is frequently produced an unusual tape winding state in which, due to changes in temperature or changes in operating environments, the tape housed within the tape cassette is subsequently loaded in the recording and/or reproducing apparatus and the tape reels rotated. In extreme cases of the unusual tape winding state, a gap is produced between the tape reels and the tape or within a coil of the wound tape. Such an unusual tape winding state is termed herein as a slack winding state, while a tape cassette subject to the slack winding state is termed herein as a slack winding cassette.

If the slack winding cassette, in which a tape is in the slack winding state due to the environmental changes as described above, is loaded on a recording and/or reproducing apparatus, and the tape runs at an elevated speed, such as for a fast feed or fast rewind, the reel servo system becomes unstable thereby rendering reel motor control impossible. The result is that the tape wound on the tape reel is pulled out of the tape cassette onto a tape running path within the recording and/or reproducing apparatus. The excess tape pulled out becomes entwined around tape guides to render tape running impossible.

For coping with the slacked tape, it is possible to rewind the tape slowly by providing a difference in the number of revolutions in the tape speed between the supply side tape reel on one hand and the rewind side tape reel on the other hand. While the method is unobjectionable for low-speed tape running, tape slack of the slack winding tape cassette cannot be taken up for high-speed tape running such as for fast feed or rewind, such that the tape is pulled out in an excess amount onto the tape running path.

For coping with a slack tape, it is also possible to refrain simply from acceleration control to set up a constant speed control until such time that the tape slack is taken up completely. However, this method is not satisfactory for taking up tape slack of the slack winding tape cassette for a recording and/or reproducing apparatus which is in need of high-speed tape running or high-speed tape accessing.

OBJECTS OF THE INVENTION

It is an object of the present invention to provide a reel servo device whereby a tape loaded in a recording and/or reproducing apparatus may run perpetually in a normal running state.

It is another object of the present invention to provide a reel servo device in which, even in the case of an unusual tape running state upon loading the slack winding cassette in the recording and/or reproducing apparatus, it is possible to prevent reel motor control from becoming impossible by preventing the reel servo system controlling a reel motor rotationally driving a tape reel from becoming unstable.

The above and other objects of the present invention will become apparent from the following description of the preferred embodiments and the claims.

SUMMARY OF THE INVENTION

The reel servo device employed in conjunction with the recording and/or reproducing apparatus according to the present invention includes separate reel motors for rotationally driving a supply side tape reel about which a tape is wound and a rewind side tape reel. The reel servo device includes unusual tape running detection means for detecting an unusual tape running state by detecting unusual rotation of the supply side tape reel and the rewind side tape reel, tension control data generating means for generating tension control data based on tape tension data from the tape tension detection means, normal acceleration control data generating means for generating normal acceleration control data, and changeover means for switching between the normal acceleration control data and the above-mentioned tension control data.

The unusual tape running detection means is adapted for detecting an unusual tape running state based on the slack winding state in which the tape winding state is in a slacked state due to temperature changes during tape cassette transport or changes in the tape operating environments so that the tape can be easily reeled out of the cassette halves without mechanically rotating the tape reels.

The unusual tape running detection means includes a tape running amount ratio detection unit for finding the ratio between the tape running amount at the supply side and that at the rewind side based on the rotational speed of the supply side tape reel, the amount of the tape wound about the supply side tape reel, the rotational speed of the rewind side tape reel and the amount of the tape wound about the rewind side tape reel , and a slack winding state decision unit for deciding, based on the tape running amount ratio from the tape running amount ratio detection unit and the tape speed, whether or not the tape winding state in the tape cassette is the aforementioned slack winding state. The slack winding state decision unit detects an unusual tape running state.

The normal acceleration control data generating means includes an acceleration torque calculating unit for finding an acceleration torque during normal acceleration control based on the take-up quantity on the rewind tape reel and the inertia of the rewind tape reel, and a correction torque calculating unit for finding the correction torque correcting the acceleration torque from the acceleration torque calculating unit based on an error between the set acceleration and the actual acceleration.

The tension controlling data generating means is also adapted for generating tension controlling data conforming to the size of the tape cassette having the tape housed therein. The tension controlling data generating means comprises a differentiating circuit for differentiating tape tension data from a tension arm provided on the supply side, and a quaternary value unit for converting an output of the differentiating unit into corresponding four-valued data. The corrected four-valued output becomes the above-mentioned tension controlling data.

The reel servo device according to the present invention performs reel servo using normal acceleration control data in the absence of an unusual tape running state, while performing reel servo using tension controlling data based on the tape tension data in case of the occurrence an unusual tape running state. That is, if an unusual tape running state is incurred, reel servo is performed so as to slacken or tension the tape if the tape tension is being increased or decreased, respectively. By this reel servo, the risk of the tape being pulled out into the recording and/or of reproducing apparatus in excess quantities or an excessive tension being applied to the tape may be eliminated even if an unusual tape running state is incurred.

DESCRIPTION OF THE PREFERRED EMBODIMENT

Figure 1:
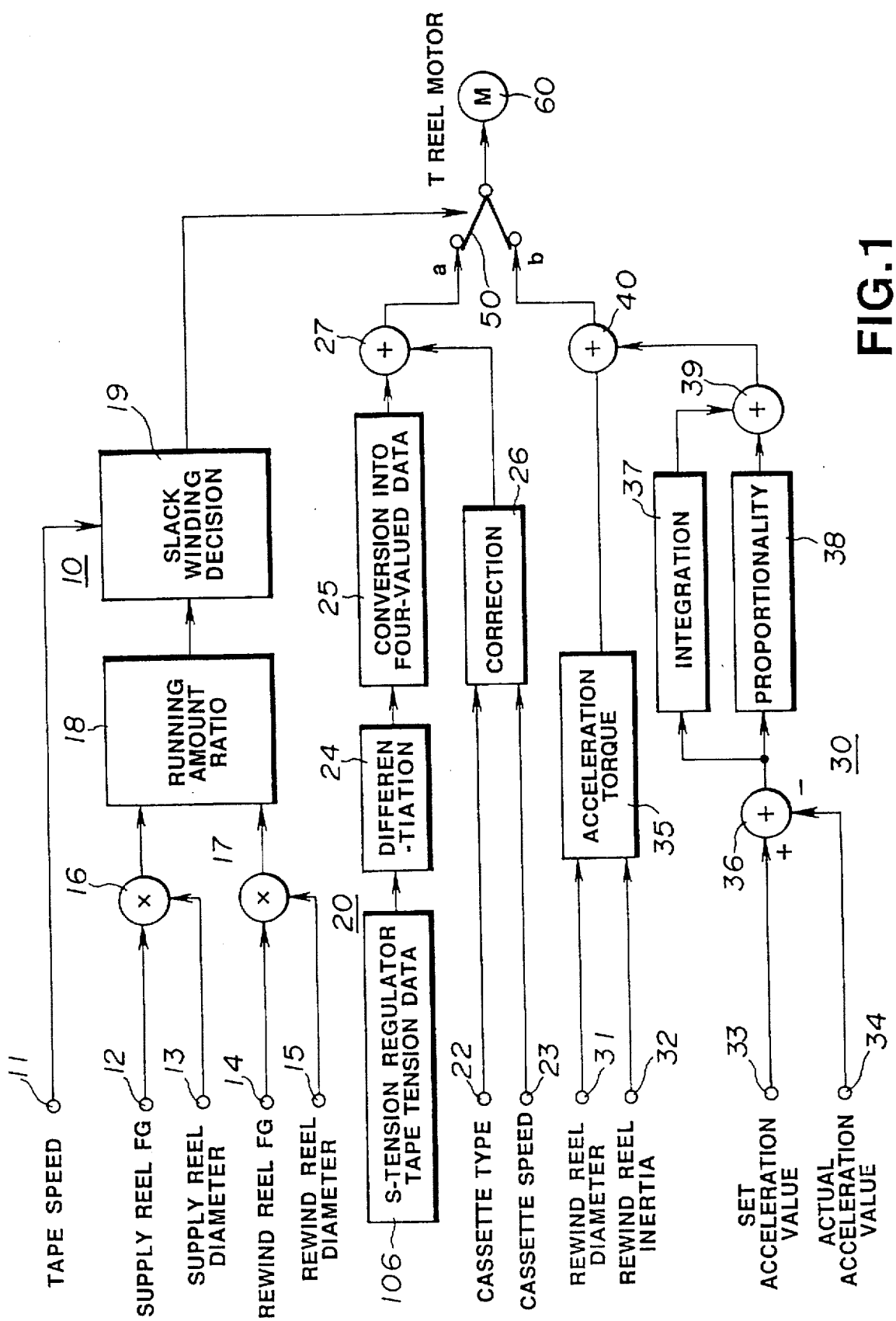
FIG. 1 is a schematic block circuit diagram showing an arrangement of a reel servo device according to the present invention.

By referring to the drawings, a reel servo device of the present invention, as applied to a recording and/or reproducing apparatus, such as a video tape recorder, employing a tape, such as a magnetic tape, as a recording medium, is explained in detail.

The reel servo device according to the present invention is arranged as shown in a block circuit diagram of FIG. 1. That is, the present reel servo device is applied to a recording and/or reproducing apparatus, such as a tape recorder, including a supply side tape reel for supplying a tape, a rewind side reel and separate reel motors for running the tape reels independently of each other.

The reel servo device comprises an unusual running detection circuit 10 for detecting unusual tape running by detecting unusual rotation of the reel motors for running the supply side and rewind side tape reels independently of each other, a tension controlling data generating circuit 20 generating tension controlling data based on tape tension data from a tension arm as tension detection means as later described, a usual acceleration control data generating circuit 30 generating normal acceleration control data and a changeover switch as changeover means for switching between the normal acceleration data and the aforementioned tension controlling data based on a detection output of the unusual running detection circuit 10.

Figure 2:
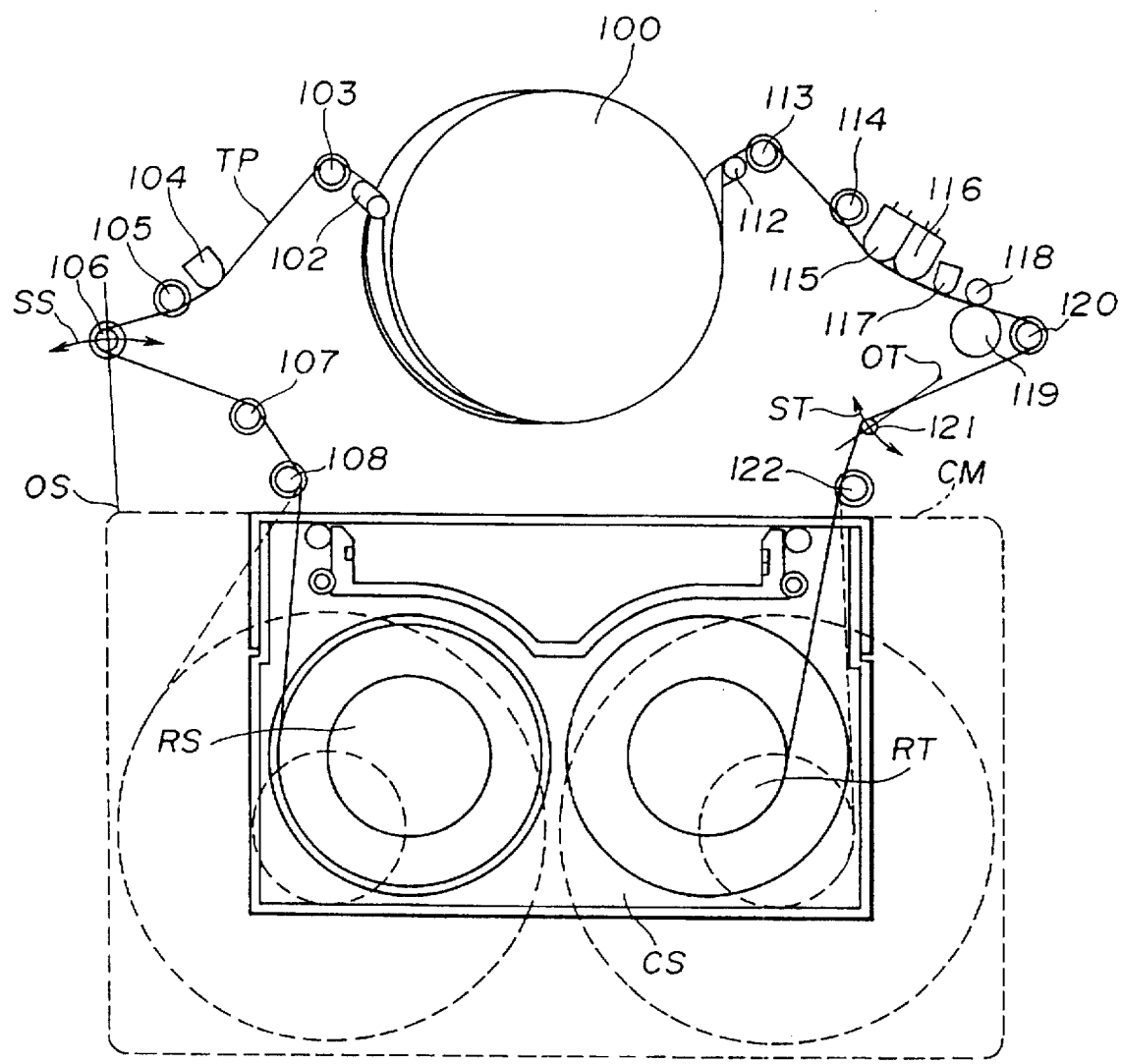
FIG. 2 is a schematic view showing an arrangement of a tape running system of the recording and/or reproducing apparatus to which the reel servo device of the present invention is applied.

Before proceeding to a concrete explanation of the reel servo device of the present invention, shown in FIG. 1, the tape running system of the recording and/or reproducing apparatus to which the present reel servo device is applied is explained by referring to FIG. 2.

The tape running system shown in FIG. 2 includes, looking from the tape supply side, a pair of guide rolls 108, 107, a supply side tension arm 106 and a guide roll 105, as supply side tape tension detection means or supply side tension regulator, a full-width erasure head or main erasure head 104, a pair of inlet side tape guides 103, 102, a rotary head drum 100, a pair of outlet side tape guides 112, 113, a guide post 114, a control/time code/cue recording/playback head 115 and its erasure head 116, a control/time code confirmation head 117, a capstan 118, a pinch roll 119, a tape guide roll 120, a take-up tension arm 121 as take-up or rewind side tape tension detection means or rewind side tension regulator, and a guide roll 122.

A tape TP, reeled out from a supply side tape reel RS of a tape cassette CS, is guided by the tape supply side guide rolls so as to be wrapped around the rotary head drum 100 before being guided by rewind side guide rolls and rewound by the rewind side tape reel RT.

The tape tension on the tape TP is detected by the supply side tension arm 106, rotated in the direction of arrow SS in FIG. 2, about a fulcrum OS as a center of rotation, and the rewind side tension arm 121, rotated in the direction of arrow ST in FIG. 2, about a fulcrum OT as a center of rotation. Thus, in the above-described tape running system, tape tension is detected at and by the supply side tension arm 106 during the initial running phase prior to reaching the constant-speed rotation, and a tension servo is applied to a supply side reel motor, not shown, so that the detected value of the tape tension, that is tape tension data, will be constant. At this time, the take-up reel motor rotationally driving the rewind tape reel RT is controlled in acceleration so that the rotational velocity reaches a set rotational velocity.

Meanwhile, in the above-described tape running system, if the initial running state is applied to the above-mentioned slack wound cassette, tape tension cannot follow the behavior of the reel motor, thus producing a slack state of the tape TP.

Besides, with the slack wound cassette, there is a deviation between true inertia and apparent inertia on occurrence of an unusual rotation of the tape reel.

The result is that, the faster the rotation of the supply side reel motor and/or the take-up reel motor becomes, the more unusual the state of rotational driving becomes. If the rotation of the supply side reel motor and/or the take-up reel motor becomes unusually fast, an excessive tape tension is applied to the tape to damage or even disrupt the tape.

In consideration of this, the reel servo device of the present invention is designed for perpetually detecting the unusual tape running state by detecting the state of rotation of the supply reel RS and the rewind tape reel RT. That is, when the reel servo device detects unusual running of the supply side tape reel RS and/or rewind side tape reel RT, the T reel motor, which so far performed the usual acceleration control, changes over from the usual acceleration control to the tension control based on the tape tension data supplied from the tension arms 106 and 121.

The reel servo device according to the present invention performs the detection of an unusual running state of the supply side tape reel RS and/or rewind side tape reel RT and the changeover from the usual acceleration control to the tension control responsive to detection of the unusual running state by an arrangement shown in FIG. 1.

Returning to FIG. 1, the unusual rotation detection circuit 10 of the reel servo device according to the present invention is designed for detecting the unusual running state of the tape TP based on the tape take-up state when the tape cassette is in the state of the slack wound tape in which the tape may be rewound easily without compulsively rotating the reel due to changes in temperature and operating environments caused, for example, by tape cassette transport.

That is, the unusual running detection circuit 10 comprises a tape running amount ratio detection unit 18 for finding the ratio between the tape running amount at the supply side and that at the rewind side based on the rotational speed of the supply side tape reel RS, the amount of the tape TP wound about the supply side tape reel RS, the rotational speed of the rewind side tape reel RT and the amount of the tape TP wound about the rewind side tape reel RT, and a tape winding state decision unit 19 for deciding, based on the tape running amount ratio from the tape running ratio detection unit 18 and the tape speed, whether or not the tape winding state on the tape reels is the above-mentioned slack winding state. The tape running state is decided to be the unusual tape running state when a decision is given by the decision unit 19 that the tape take-up state is the slack winding state.

Specifically, the unusual running detection circuit 10 employs frequency generator (FG) pulses, supplied from terminal 12 in response to the rotation of the supply side reel motor, as rotational speed data for the supply side reel RS, while employing tape diameter data of the supply reel RS, supplied from terminal 13, as tape amount data for the supply side tape reel RS. Similarly, the unusual running detection circuit 10 employs frequency generator (FG) pulses, supplied from terminal 14 in response to the rotation of the T reel motor, as rotational speed data for the rewind side tape reel RT, while employing tape diameter data of the rewind side reel RT, supplied from terminal 15, as tape amount data for the rewind side tape reel RT. The FG pulses and the tape diameter data on the side of the supply side tape reel are transmitted via a multiplier 16 to the tape running amount ratio detection unit 18, while the FG pulses and the tape diameter data on the side of the rewind side tape reel are transmitted via a multiplier 17 to the tape running amount ratio detection unit 18.

The tape running amount ratio detection unit 18 detects the tape running amount ratio from outputs of the multipliers 16, 17. The detected data of the tape running amount ratio is supplied to the tape winding state decision unit 19.

Figure 3:
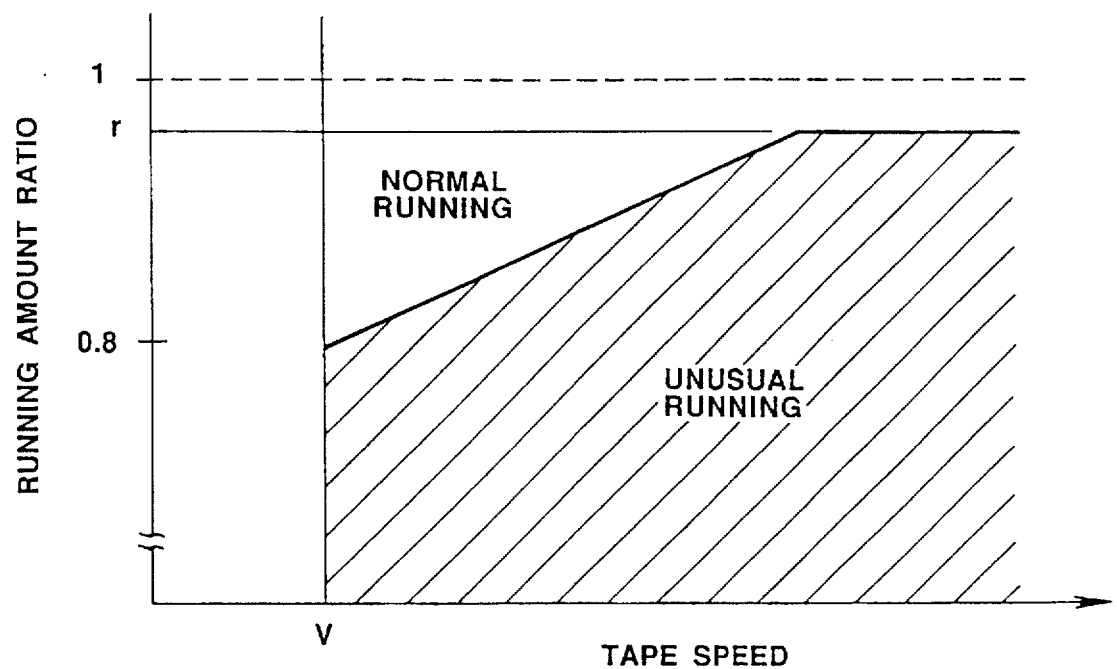
FIG. 3 is a graph showing the state of unusual running detection based on the ratio between the tape speed and the amount of tape running.

The tape winding state decision unit 19 decides, based on the tape speed data supplied from terminal 11 and the tape running amount ratio data from the tape running amount ratio detection unit 18, whether or not the tape winding state is the above-mentioned slack winding state. Specifically, the slack winding decision unit 19 decides that the tape running state, in which the relation between the tape speed and the tape running amount is such that the tape speed is higher than a predetermined speed v and the tape running amount ratio is within a range of 0.8 to a predetermined value r less than 1.0 in relation to the tape speed, as indicated by hatched lines in FIG. 3, is the state of unusual rotation, and that the tape running state other than that described above is the usual running state.

An output of the tape winding state decision unit 19 is supplied as a changeover control signal to the changeover switch 50. To a fixed terminal a of the changeover switch 50, there is supplied a tension controlling data from the tension controlling data generating circuit 20. To the other fixed terminal b, there is supplied normal acceleration control data from the normal acceleration control data generating circuit 30.

The tension controlling data generating circuit 20, connected to the fixed terminal a of the changeover switch 50 includes a differentiating circuit 24 for differentiating tape tension data from the supply side tension arm 106 and a quaternary value unit 25 for converting the output of the differentiating unit 24 into quaternary valued data. An output of the quaternary value unit 25 is to be the above-mentioned tension controlling data.

It is noted that the tension controlling data generating circuit 20 is also adapted for generating tension controlling data conforming to the size of a tape cassette accommodating the tape TP therein. That is, the circuit 20 is adapted for generating tension controlling data conforming to the tape cassette CM larger in size than the tape cassette CS, as shown by broken lines in FIG. 2.

Thus the tension controlling data generating circuit 20 comprises, besides the differentiating circuit 24 and the quaternary value circuit 25, a correction unit 26 for generating correction data for correcting the tension control data from the quaternary value circuit 25 based on the tape cassette size data supplied to terminal 22 and the tape speed data supplied to terminal 23, and an additive node 27 for summing an output of the correction unit 26 and an output of the quaternary value unit 25. The quaternary valued output, as corrected based on the output of the correction unit 26, is employed as the tension controlling data.

The usual acceleration control data generating circuit 30, connected to the fixed terminal b of the changeover switch 50, comprises an acceleration torque calculating unit 35 for finding an acceleration torque during usual acceleration control based on the tape take-up quantity on the rewind tape reel RT supplied via terminal 31 and inertia data of the rewind tape reel RT supplied via terminal 32, and a correction torque calculating unit, made up of an integrating circuit 37, a proportionality calculating unit 38 and an additive node 39, for correcting the acceleration torque from the acceleration torque calculating unit 35 based on an error between a set acceleration torque and the actual acceleration supplied to terminal 34. An error between the set acceleration and the actual acceleration is found by subtracting the actual acceleration from the set acceleration by a subtractor 36. The error is supplied to the integrating circuit 37 and the proportionality calculating unit 38, outputs of which are summed by the additive node 39 to find the correction torque. Data of the correction torque are supplied to an additive node 40 supplied with the data of the acceleration torque to correct the acceleration torque.

The above-mentioned tension controlling data from the tension controlling data generating circuit 20 and the usual control data from the usual acceleration data generating circuit 30 are supplied to the changeover switch 50 which is then changed over based on the detection output of the unusual running detection circuit 10. One of the above-mentioned controlling data from the changeover switch 50 is supplied as controlling data to, for example, a take-up reel motor 60. The take-up reel motor 60 is controlled based on a control voltage conforming to the controlling data.

That is, if, with the reel servo device of the present invention, it is decided that the tape is wound on a tape reel in a slack state and the tape running state is unusual, tape tension data from the tension arm 106 is differentiated. If the value of differentiation is positive, the tape tension being then increasing, the take-up reel motor is controlled in a direction of slackening the tape tension on the side of the rewind tape reel RT, whereas, if the value of differentiation is negative, the tape tension being then decreasing, the take-up reel motor is controlled in a direction of tensioning the tape tension on the side of the rewind tape reel RT.

Figure 4:
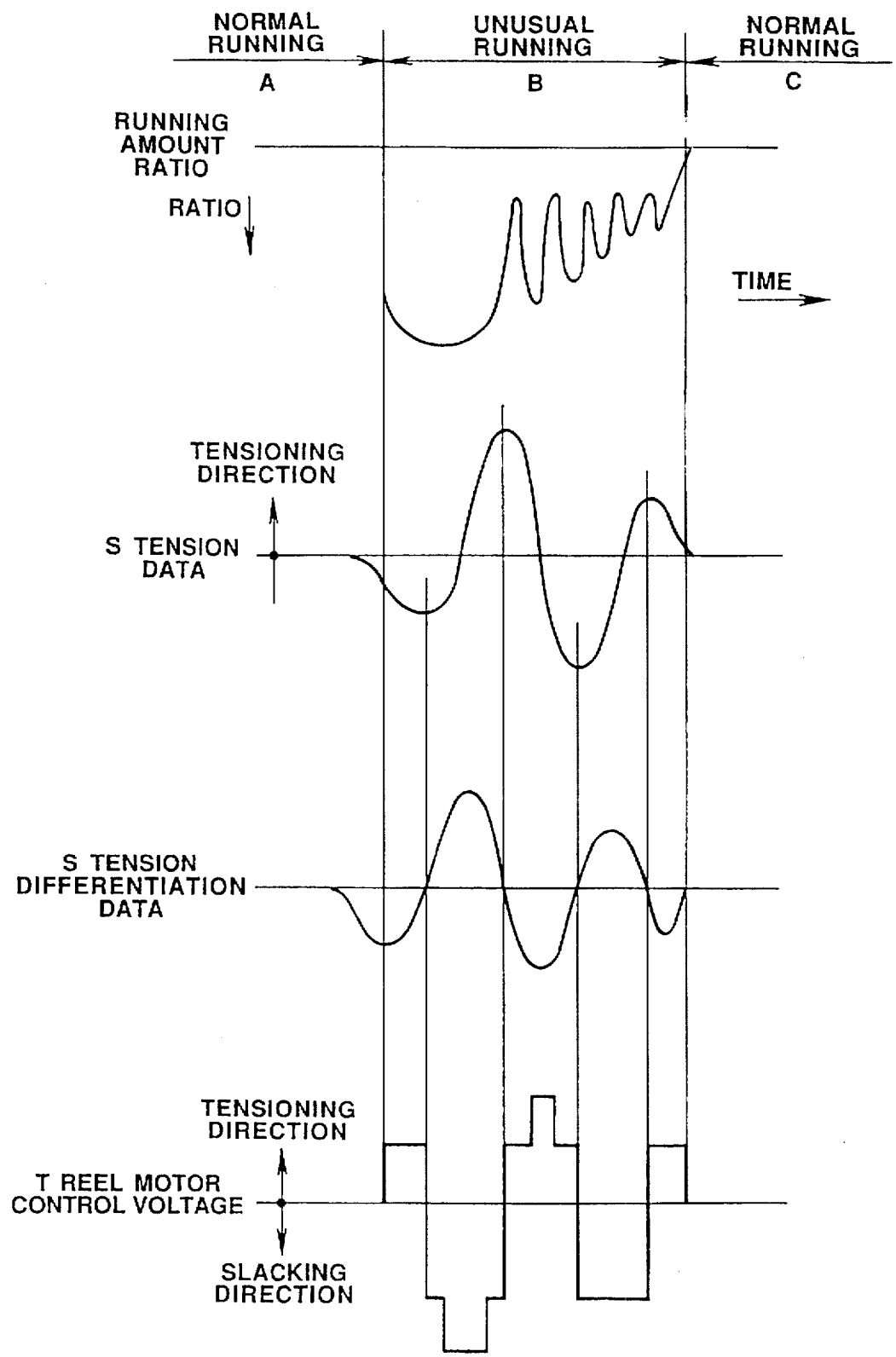
FIG. 4 is a graph showing the ratio of the amount of tape running, supply side tension data, differentiated supply side tension data and the reel motor control voltage during unusual running in the reel servo device according to the present invention.

FIG. 4 shows the tape running amount ratio, supply side tension data of the supply side tension arm 106, differentiation data of the supply side tension data (differentiated supply side tension data) and a control voltage applied to the take-up reel motor in the reel servo device according to the present invention.

Referring to FIG. 4, in case of transition from the normal running state shown for a time period A to the unusual running state shown for a time period B, the tape running amount is changed significantly from a constant value. The supply side tension data from the supply side tension arm 106 is also changed significantly responsive to this unusual running, at the same time that the differentiated supply side tension data is also changed significantly.

In this case, if the differentiated supply side tension data is changed to a tensioning direction, the control voltage to the take-up reel motor assumes a value of controlling the take-up reel motor in a tape slackening direction, whereas, if the differentiated supply side tension data is changed to a slackening direction, the control voltage to the take-up reel motor assumes a value of controlling the take-up reel motor in a tape tensioning direction.

Meanwhile, the control voltage for the take-up reel motor is changed in two stages in both the tensioning direction and the slackening direction, by converting the differentiation data from the differentiating unit 24 into quaternary valued data for preventing acute changes in the control voltage value. In the present embodiment, reel servo is prevented from being converged with a delay by having the control voltage not changed acutely.

During the usual running of the time period C, following the time period B, the tape running amount ratio is reverted to the above-mentioned constant value, with the supply side tension data and the differentiation data thereof being also rendered constant. Thus the control voltage to the take-up reel motor is not of value of tensioning or slackening the tape TP, with the take-up reel motor being rotated at a constant speed.

With the above-described reel servo device of the present invention, as applied to a recording and/or reproducing apparatus having at least the supply side tension arm 106 and the reel motors independent for the tape supply side and the tape rewind side, the take-up reel motor which is usually in the acceleration control mode is changed over to a tension control mode based on the tension data at the supply side tension arm 106 so that excess tension applied to the tape TP is suppressed for preventing tape damage from being produced to allow for continued tape running. Consequently, since there is no risk of tape damage due to the slack winding cassette, acceleration or deceleration may be achieved promptly for the reel mode to improve high-speed access response characteristics. Besides, the tension of the tape running system may be lowered effectively.

In addition, the tension control data generating circuit 20 in the present reel servo device is adapted for generating tension controlling data responsive to the size of the tape cassette having the tape housed therein, so that the device is able to accommodate changes in the inertia caused by the changes in the tape cassette size.

What is claimed is:

1. A reel servo device for controlling a take-up reel motor of a tape recording and/or reproducing apparatus comprising:

means for generating normal acceleration data based on the take-up reel tape diameter and the take-up reel inertia;

means for generating tension control data based on a detected tape tension;

switch means having two inputs respectively connected to said normal acceleration data and to said tension control data, said switch means being responsive to a control signal for selectively supplying a servo control signal to said take-up reel motor; and means for detecting a tape slack condition and controlling said switch means to supply said normal acceleration data to said motor when no tape slack is detected and to supply said tension control data to said motor when tape slack is detected, said means for detecting including tape running amount ratio means for producing an output signal representing a ratio between a tape supply reel running amount and the tape take-up reel running amount and a tape slack decision circuit receiving a tape speed signal and said output signal from said tape running amount ratio means for producing said control signal fed to said switch means for causing said switch means to output said tension control data when said ratio is above a predetermined level and said tape speed is a non-zero value.

2. The reel servo device as claimed in claim 1, wherein said means for generating normal acceleration data includes an acceleration torque calculating unit for calculating an acceleration torque for normal acceleration control based on tape winding amount data on said tape rewind side tape reel and on inertia data of said tape rewind side tape reel, and a correction torque calculating unit for calculating a correction torque for correcting said acceleration torque from said acceleration torque calculating unit based on an error between a set acceleration torque value and an actual acceleration torque value.

3. The reel servo device as claimed in claim 2, wherein said means for generating tension control data includes a differentiating circuit for differentiating tape tension data from a tension arm provided on said tape supply reel side.

4. The reel servo device as claimed in claim 3, wherein said means for generating tension control data further includes a quaternary value unit for converting an output of said differentiating circuit into corresponding four-valued data.

5. The reel servo device as claimed in claim 4, wherein the tape is housed in a cassette and said means for generating tension control data further includes a correction unit for generating correction data for correcting said four-valued data from said quaternary value unit based on tape cassette size data and tape speed data.

6. The reel servo system of claim 1 wherein the tape recording and/or reproducing apparatus is a cassette tape recording and/or reproducing apparatus with the tape housed in a tape cassette and wherein said means for generating tension control data generates said tension control data also based on a size of the tape cassette.

* * * * *